(12) United States Patent
Kirk et al.

(10) Patent No.: US 6,400,447 B1
(45) Date of Patent: Jun. 4, 2002

(54) DIFFERENTIATION OF TARGETS IN OPTICAL STATION BASED ON THE STRENGTH OF THE REFLECTED SIGNAL

(75) Inventors: Geoffrey R Kirk, San Francisco; Robert J. Lamm, Mountain View, both of CA (US)

(73) Assignee: Trimble Navigation, LTD, Sunnyvale, CA (US)

( * ) Notice: Subject to any disclaimer, the term of this patent is extended or adjusted under 35 U.S.C. 154(b) by 0 days.

(21) Appl. No.: 09/524,426

(22) Filed: Mar. 11, 2000

(51) Int. Cl.[7] .............................. G06K 9/00; G01C 3/08
(52) U.S. Cl. ...................................... 356/4.07; 382/103
(58) Field of Search .......................... 356/4.07; 382/103, 382/181

(56) References Cited

U.S. PATENT DOCUMENTS

| | | | | |
|---|---|---|---|---|
| 4,480,192 A | * | 10/1984 | Albrecht et al. ............ | 250/550 |
| 4,497,065 A | * | 1/1985 | Tisdale et al. ................. | 382/1 |
| 4,511,248 A | * | 4/1985 | Abbas ............................ | 356/4 |
| 4,518,253 A | * | 5/1985 | Takahashi ..................... | 356/4 |
| 4,614,426 A | * | 9/1986 | Baxter et al. .................. | 356/1 |
| 4,866,781 A | * | 9/1989 | Borken et al. ................. | 382/1 |
| 5,345,304 A | * | 9/1994 | Allen ............................. | 356/5 |
| 5,357,331 A | * | 10/1994 | Flockencier .................. | 356/5 |
| 5,638,164 A | * | 6/1997 | Landau ...................... | 356/5.01 |
| 5,790,242 A | * | 8/1998 | Stern et al. ................. | 356/4.04 |
| 5,970,433 A | * | 10/1999 | Oka et al. .................... | 702/159 |
| 6,042,050 A | * | 3/2000 | Sims et al. ................. | 244/3.17 |
| 6,133,992 A | * | 10/2000 | Tanaka et al. ............. | 356/5.07 |

* cited by examiner

*Primary Examiner*—Thomas H. Tarcza
*Assistant Examiner*—Brian K. Andrea
(74) *Attorney, Agent, or Firm*—Boris G. Tankhilevich

(57) ABSTRACT

A system and method for selecting at least one target with strong reflectivity from a set of strong and weak reflectors by using an amplitude of a reflected signal to make such a selection. The pre-computed look-up table that relates an amplitude of the reflected signal from a target with a strong reflectivity to the distance at which such target is located is used in a real-time mode to separate weak reflectors from strong reflectors. In the post-processing mode the usage of normalizing function allows to further differentiate between strong reflectors (like windows) and very strong reflectors (like prisms).

5 Claims, 5 Drawing Sheets

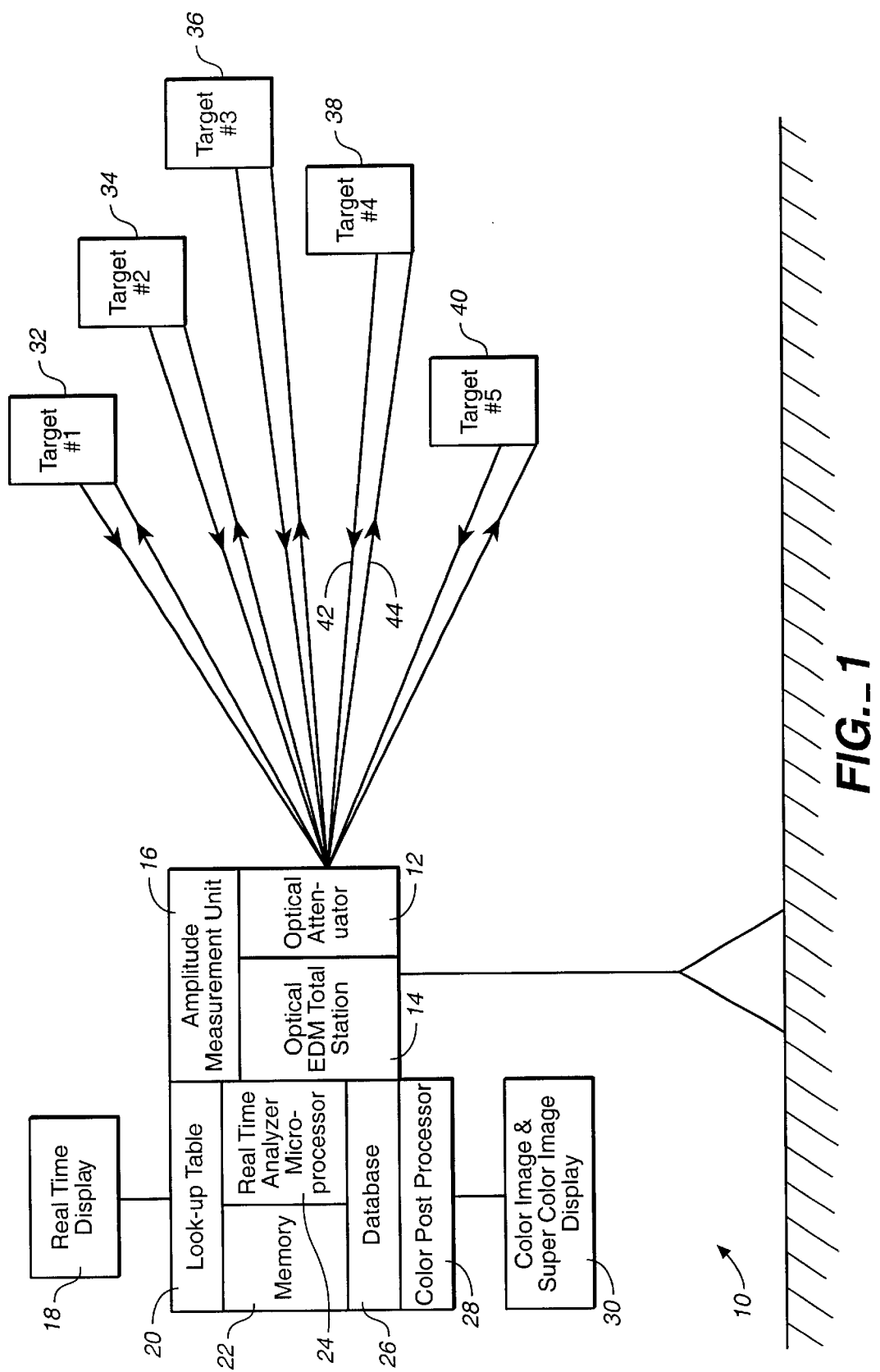
FIG._1

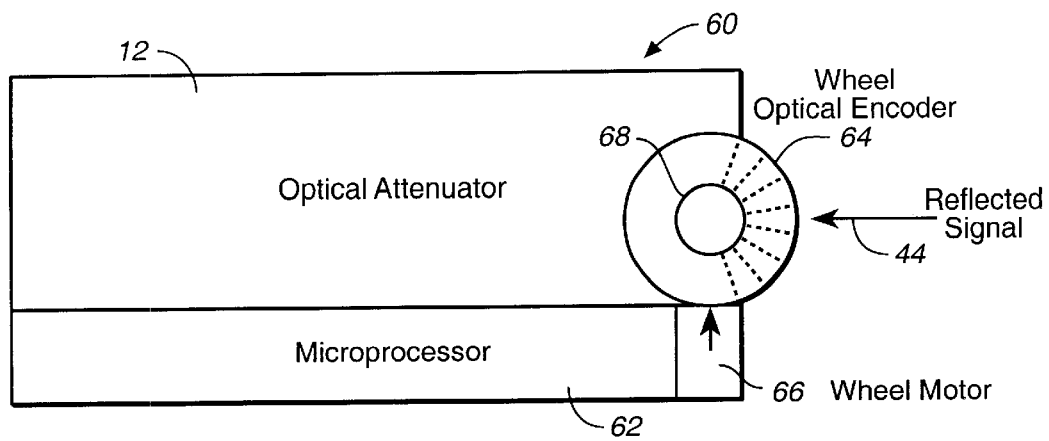
FIG._2
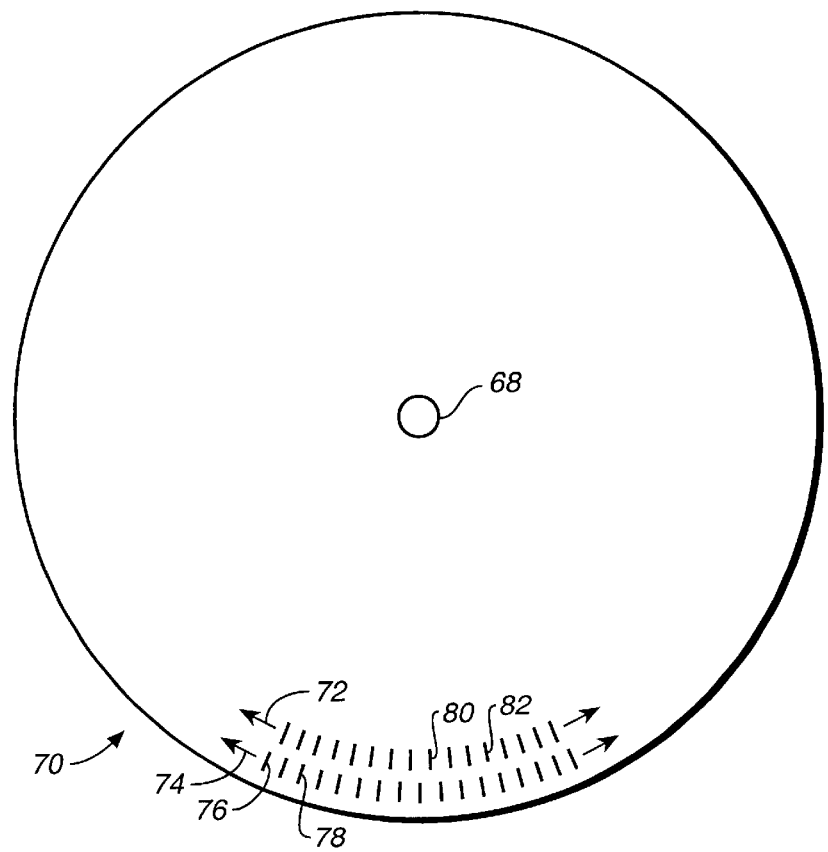
FIG._3
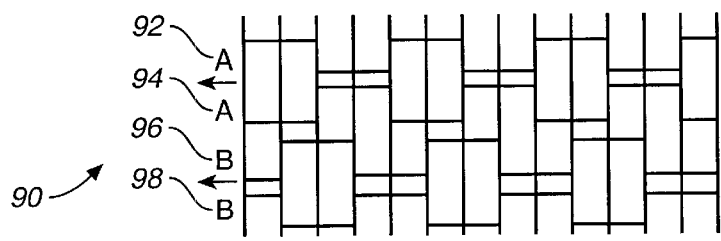
FIG._4

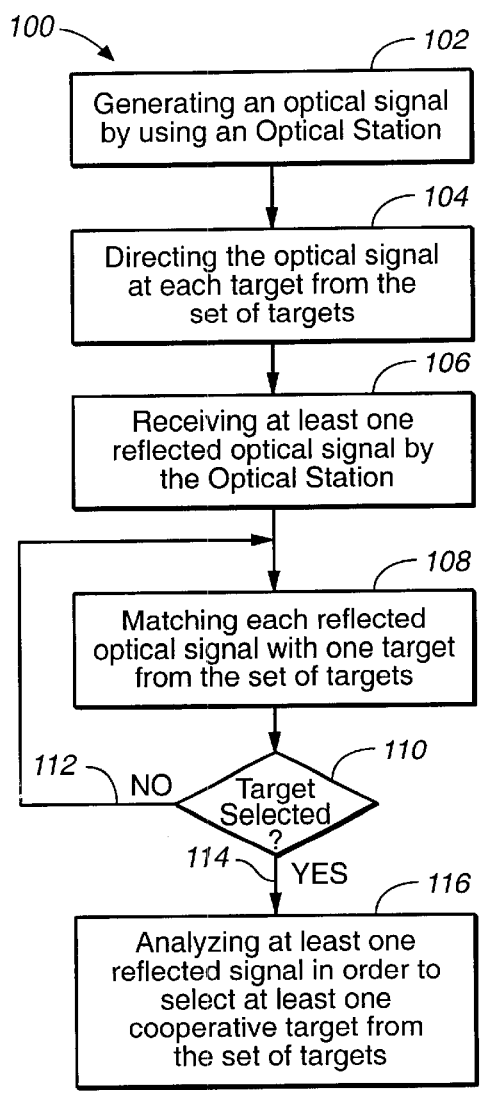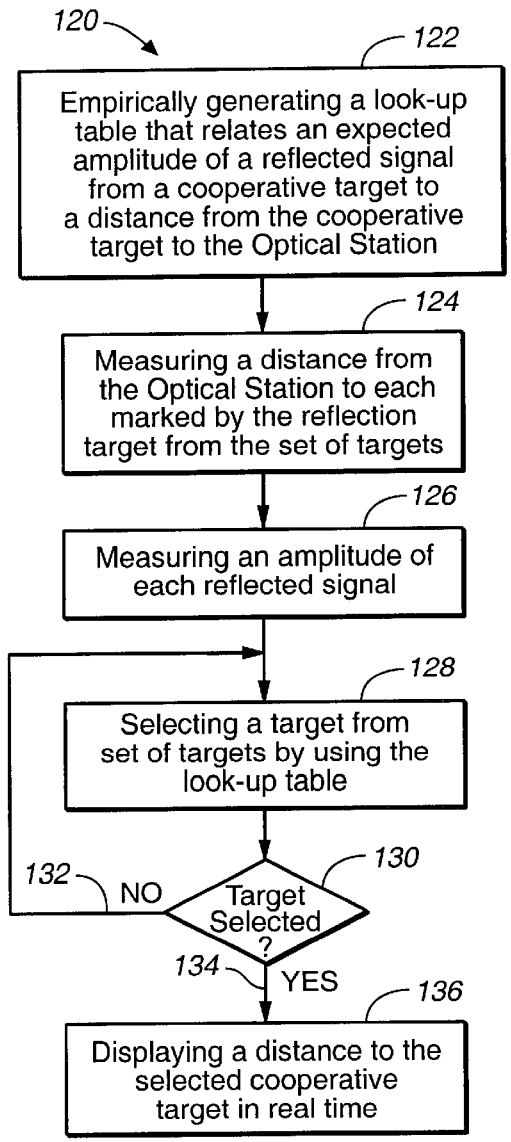

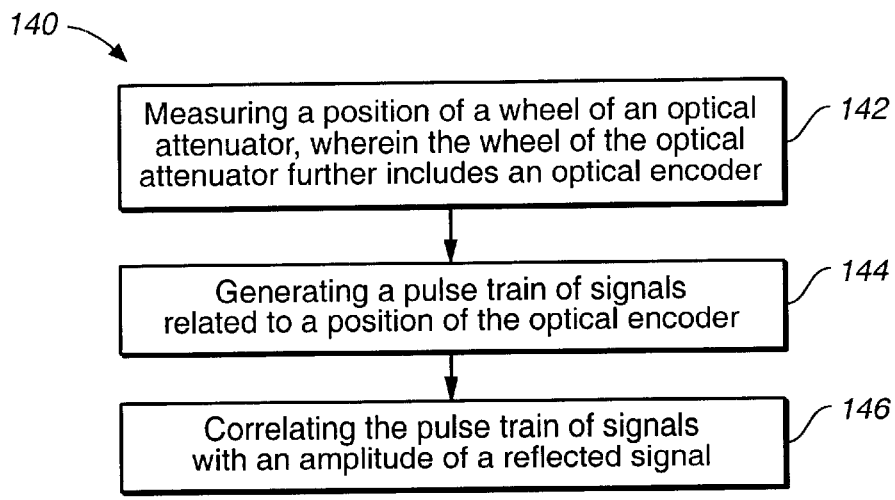
FIG._7
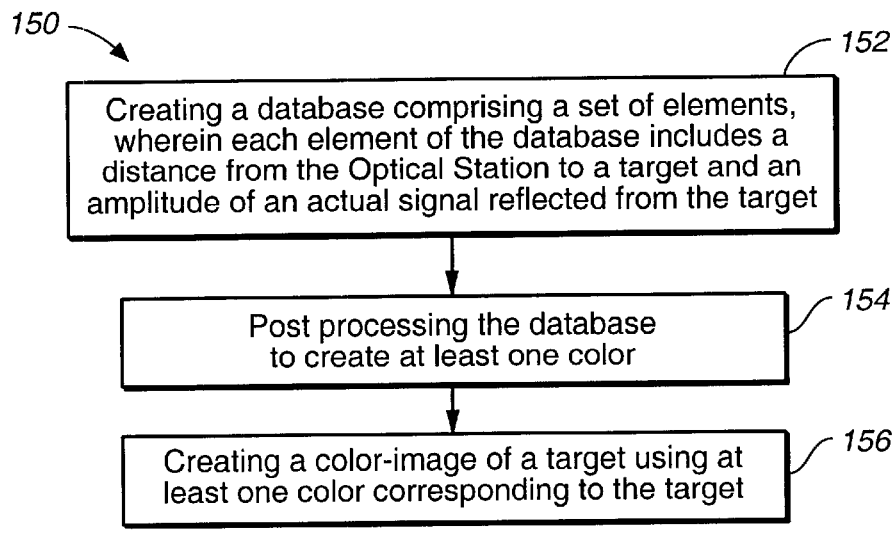
FIG._8
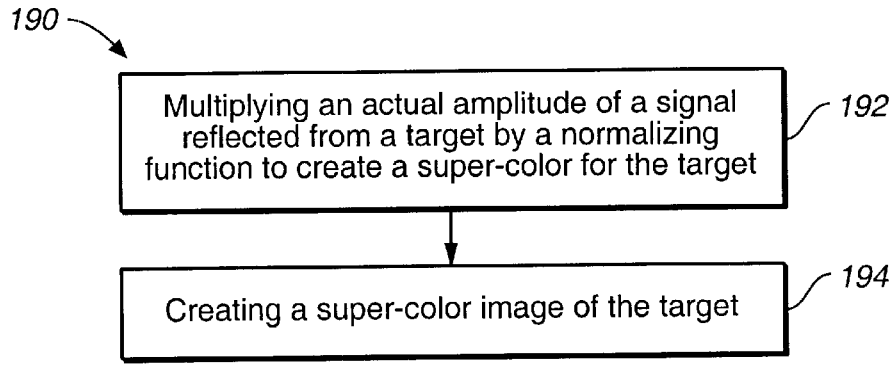
FIG._12

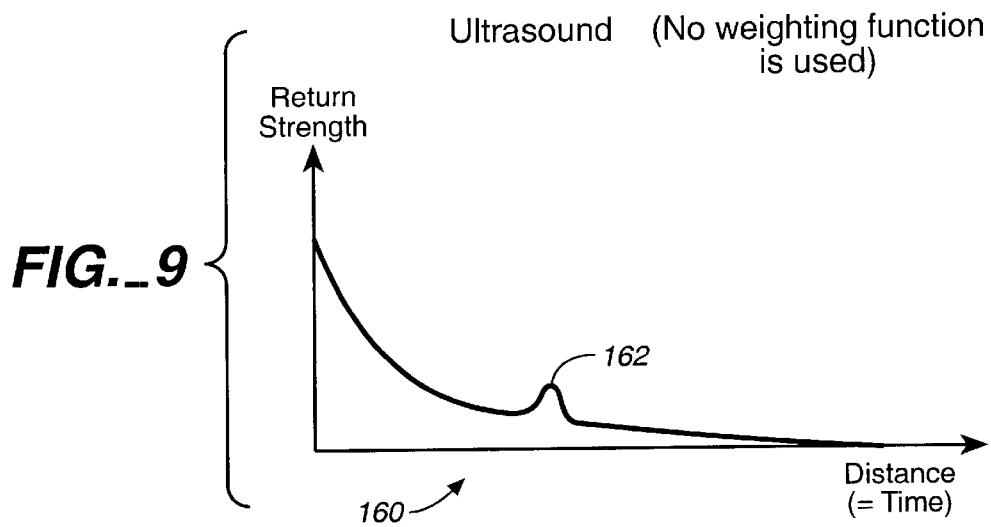
FIG._9
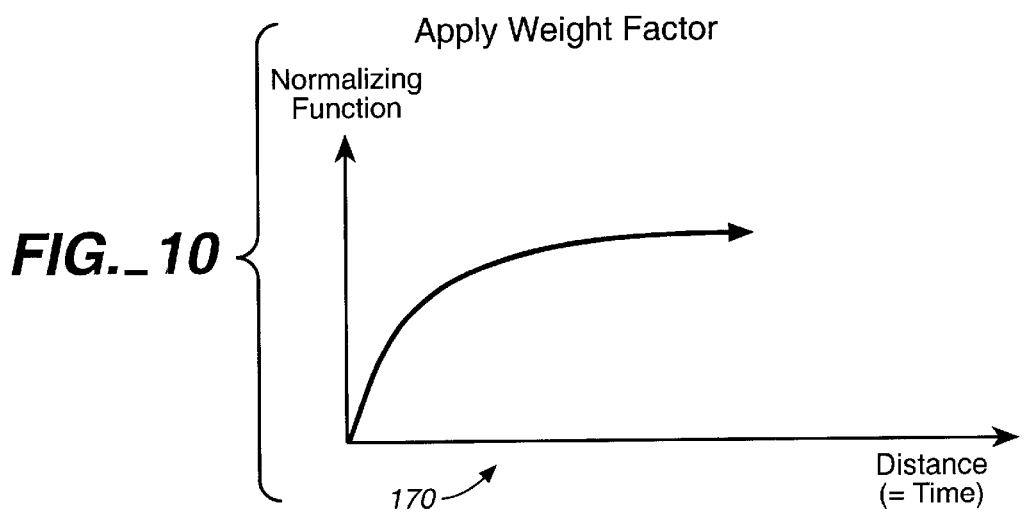
FIG._10
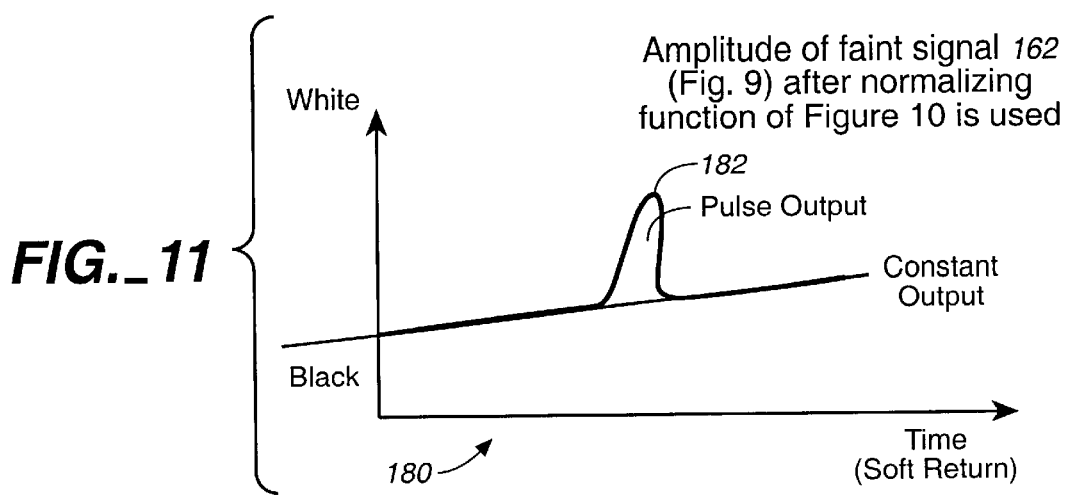
FIG._11

DIFFERENTIATION OF TARGETS IN OPTICAL STATION BASED ON THE STRENGTH OF THE REFLECTED SIGNAL

BACKGROUND

1. Field of the Invention

The present invention relates generally to the field of optical surveying instruments, and specifically to the field of differentiation of targets in optical station.

2. Description of the Background Art

In the available art related to optical surveying instruments, there are optical surveying instruments designed to work in areas where the GPS signals are obstructed or otherwise unavailable, such as tunnels, parking garages, and dense forests as well as to measure building facades or dam faces that are difficult or dangerous to reach.

Trimble Navigation Ltd, based in Sunnyvale, Calif., introduced in 1998 the TTS™ 500 optical surveying instrument that is designed to work in the areas where satellite signals are unavailable. The TTS 500 system incorporates a unique Electronic Distance Meter (EDM) design and a high quality optical system. This design enables high-speed, high accuracy distance measurements to almost any object, as well as to both reflective sheet targets and traditional glass prisms.

The TTS 500 system utilizes the precise measurement of timing information in order to calculate a range measurement. The TTS 500 system calculates distance measurements through the measurement of the travel time or "time of flight" of short duration light pulses. The TTS 500 system generates short infrared light pulses which are transmitted through the telescope to a selected target, such a concrete wall or cube corner reflector (a traditional survey prism reflector). The light pulses reflect off the target and returned to the TTS 500 where they are focused by the receiver lens onto a high-speed light detector within the instrument. The TTS electronics determine the round time for the light pulse. The travel time is used to compute the distance between the instrument and the target. The method of using the time of flight differs from the traditional phase resolving technique typically used in optical total stations for survey applications. A detailed discussion of both the traditional and time of flight methods can be found in J. M. Rüeger's book, *Electronic Distance measurements, An Introduction*, Fourth Edition, Springer-Verlag, Berlin (1996).

The light source of the Laser Module is a pulsed laser diode. The pulsed laser in the Laser Module generates a short infrared light pulse, which is optically divided into two parts. The EDM incorporates a 30x-magnification telescope with integrated cross-hairs (reticle) and an internal focusing mechanism. The main part of the Laser Pulse passes through the telescope, which is aimed at a distant target. A prism-based beam splitter is integrated into the telescope, which allows the infrared laser beam to be aligned with the optical path for visible light. The beam splitter uses a dichroic 45° mirror built into the prism. A dichroic (two-color) mirror has different behavior at different wavelengths. The mirror does not reflect visible light and allows it to pass from the target through the telescope to the operator's eyepiece. However, the 45° mirror reflects the infrared radiation of the laser. A small fraction of the light pulse, the Start Pulse, is received by a photosensitive diode in the Start Pulse receiver. The Start Pulse signal initiates a timing process using a high precision clock. The light from the transmitted Laser Pulse is reflected from the target's surface. A second photosensitive receiver detector in the EDM receives a fraction of the reflected light. This signal is called the Echo Pulse and stops the clock's timing process.

The distance between the ITS 500 EDM and various targets can be measured over a range from 2 meters to more than 10,000 meters. The distance is dependent on acceptable atmospheric conditions. With the TTS 500 EDM distances can be measured from natural surfaces, reflective surfaces such as foils and bicycle reflectors, and conventional survey glass prisms. The practical operating range of the TTS 500 EDM depends on several factors: (a) the energy of the laser pulse; (b) the reflectivity of the target; (c) the target distance; (d) the sensitivity of the receiver; and (e) possible interference from external noise sources such as sunlight and atmospheric effects that absorb or scatter the light.

The detailed measurements of the Start Pulse and Echo Pulse timing, and the internal processes to initiate measurements and report them to the instrument's's computer, are carried out in an on-board signal processing system within the EDM. The TTS 500 EDM signal processing system includes dedicated custom integrated circuits that are designed to manage very fast signals. The TTS 500 EDM electronics system, with its corrections, can measure the target distance with a single measurement to within 5 centimeters. In addition, the EDM uses statistical signal processing to reduce the measurement uncertainty to less than 5 millimeters. The user can select the number of pulses in the statistical computation. The Laser Pulse repetition rate is 1000 pulses per second. The most accurate measurements average the results of 1024 pulses.

The TTS 500 EDM system measures distances till targets that can vary from dark natural surfaces to reflective sheets and polished cube corner reflectors. The variations in target reflectivity, target distance, and atmospheric turbulence, creates significant variations in the amplitude of the reflected echo signal. The total dynamic range of the signal amplitude that should be measured is approximately 1 to 1 million. Thus, the TTS 500 EDM has the dynamic range to measure to both cooperative targets and non-cooperative targets. Cooperative targets are those that have strong reflectivity in a direction back to the source of illumination. These include reflective sheets, bicycle reflectors, and cube corner prisms. The EDM can also measure distances to non-cooperative targets such as concrete walls, paper targets, and mounts of crushed rock piles.

The operator can select the EDM sensitivity. There are two modes of operation: High Sensitivity and Reduced Sensitivity. In either mode, the Laser Pulse energy is the same, while the Echo Pulse receiver sensitivity is changed by a factor of approximately 100. The High Sensitivity mode is particularly useful in situations when the target is not readily accessible. This may be due to difficult or dangerous to reach locations, for example high walls or building faces. The High Sensitivity mode also allows for long distance prism readings. The Reduced Sensitivity mode is ideal for measurements from nearby structures and targets where other sources of reflected light might interfere with the signal. The Reduced Sensitivity mode ensures the signal from the target is the preferred signal.

A typical prism might reflect 95% of the light that falls on it. On the other hand, a non-reflective target can reflect between 90% (for a white painted smooth wall) and 5% (for a black painted surface) of the light. However, even distances to targets with low reflectivity (non-cooperative targets) can be accurately measured using the TTS 500 EDM system. Indeed, when there is a significant attenuation of the signal, such as in the case of a non-cooperative target, the pulsed laser signal (as opposed to the modulated light wave) can successfully overcome the noise within the instrument, because the pulsed laser signal has the peak power 100,000 times greater than the average power of the modulated light wave used in the phase resolving method. This characteristic enables the accurate measurements to targets with low reflectivity. Table 1 and Table 2 summarize the range specifications for the two sensitivity modes.

TABLE 1

Reflector Measurements

| Reflectors | Range for Reduced Sensitivity | Range for High Sensitivity |
|---|---|---|
| 1 Prism (50 millimeter aperture) | Up to 1,000 meters (3,280 feet) | Up to 6,000 meters (20,000 feet) |
| Reflective Foil 4" × 4" | Up to 150 meters (490 feet) | Up to 800 meters (2,620 feet) |

TABLE 2

Non-Reflector Measurements

| Target | Range for High Sensitivity |
|---|---|
| 90% reflective surface | Up to 250 meters (820 feet) |
| 5% reflective surface | Up to 58 meters (190 feet) |

The problem with the prior art TTS 500 system is that it cannot differentiate very well between a cooperative target placed far away from the EDM, and a non-cooperative target placed close enough to the EDM, because the amplitudes of the reflected signals from both the far-away cooperative target and the close-enough non-cooperative target can be very close. To deal with this problem, the prior art EDM can support the "cooperative target-only" mode (or "prism-only" mode) by turning down the sensitivity of the EDM to filter out the weaker return signals. This means that the surveyor would give up range to a located far away cooperative target when in the "prism-only" mode, but still would be able to see and measure distances to a close enough (within 30 meters of the EDM) non-cooperative target if it is a reasonable good reflector. So, the prior art EDM design gives up the range to a desirable, but located far away cooperative target, and still cannot filter out an undesirable, but located close enough non-cooperative target. There is therefore a need in the art for an efficient solution to this challenge.

SUMMARY OF THE INVENTION

To address the shortcomings of the available art, the present invention provides a method and a system for selecting at least one cooperative target from a set of targets, wherein the set of targets includes a subset of cooperative targets and a subset of non-cooperative targets.

In one embodiment, the method of the present invention comprises the following steps: (a) generating an optical signal by using an Optical Station; (b) directing the optical signal at each target from the set of targets; (c) receiving at least one reflected optical signal by the Optical Station, wherein each reflected optical signal is reflected by one target from the set of targets, and wherein each target is marked by the reflection; (d) matching each reflected optical signal with one target from the set of targets; and (e) analyzing at least one reflected signal in order to select at least one cooperative target from the set of all targets.

In another embodiment of the present invention, an empirically generated look-up table that relates an expected amplitude of a reflected signal from a cooperative target to a distance from the cooperative target to the Optical Station can be used to select a target from the set of targets. A target is selected only if an amplitude of an actual reflected signal from the selected target is equal to or greater than an expected amplitude of a reflected signal from a cooperative target placed at the selected target's distance. If this is the case, the selected target comprises a cooperative target.

In one more embodiment of the present invention, a database comprising a set of elements is created. Each element of the database includes a distance from the Optical Station to a target from the set of targets and an amplitude of an actual signal reflected from that target. The database is post processed to create a plurality of colors, wherein each color is a function of one element of the database. The plurality of colors can be used to create a color-image of each target.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a system of the present invention for differentiation of targets in optical station based on the strength of the reflected signal.

FIG. 2 shows an attenuator configured to analyze the strength of reflected signals.

FIG. 3 illustrates an attenuator wheel implemented using a glass rotary optical encoder.

FIG. 4 shows the typical outputs for the rotary optical encoder of FIG. 3.

FIG. 5 depicts a flow chart illustrating steps to select at least one cooperative target from a set of targets including a subset of cooperative targets and a subset of non-cooperative targets.

FIG. 6 is a flowchart illustrating the steps performed by the system of FIG. 1 in order to analyze a particular reflected signal if the match between the particular reflected signal and a target that reflected that signal is achieved.

FIG. 7 depicts a flowchart describing the steps performed by the system 60 of FIG. 2 including the optical attenuator in order to measure an amplitude of the reflected signal.

FIG. 8 is a flowchart for creating a database comprising a set of elements, wherein each element includes a distance from the Optical Station to a target and an amplitude of an actual signal reflected from the target.

FIG. 9 illustrates how amplitude of a return signal depends to the distance from the Optical Station.

FIG. 10 depicts a normalizing function.

FIG. 11 shows the result of multiplication of the amplitude of the return signal by the normalizing function of FIG. 10 that removes effect of distance on the amplitude of the return signal.

FIG. 12 is a flowchart that illustrates steps performed by the system of FIG. 1 in order to create in the post-processing mode a super-color image of a cooperative target.

DETAILED DESCRIPTION OF THE PREFERRED AND ALTERNATIVE EMBODIMENTS

The present invention can be best understood by focusing on the system 10 for differentiation of targets in optical station based on the strength of the reflected signal as depicted in FIG. 1. In the preferred embodiment, the system 10 comprises an Optical Station 12 equipped with the electronic distance measurement (EDM) unit configured to measure distances to all targets 32, 34, 36, 38, 40, cooperative targets (C_Target) as well as non-cooperative targets (NON_C_Target). A cooperative target (C_Target) is a target that has a substantially strong reflectivity in a direction back to the Optical Station 14, wherein a non-cooperative target (NON_C_Target) has a substantially weak reflectivity in a direction back to the Optical Station 14. In one embodiment, the EDM unit integrated into the Optical Station 14 comprises TTS™ 500 optical surveying instrument manufactured by Trimble Navigation Ltd, based in Sunnyvale, Calif. (Please, see the detailed discussion above).

As was mentioned above, the TTS 500 system generates short infrared light pulses which are transmitted through the telescope to a selected target. The light pulses reflected off the target are returned to the TTS 500 where they are focused by the receiver lens onto a high-speed light detector within the instrument. The TTS electronics determine the round time for the light pulse. The travel time is used to compute the distance between the instrument and the target.

The problem with the prior art TTS 500 system, as was also mentioned above, is that it cannot differentiate very well between a cooperative target (C_Target) placed far away from the EDM, and a non-cooperative target (NON_C_Target) placed close enough to the EDM, because the amplitudes of the reflected signals from both the far-away cooperative target (C_Target) and the close-enough non-cooperative target (NON_C_Target) can be very close.

In one embodiment of the present invention, the system 10 separates cooperative (C_Target) and non-cooperative (NON_C_Target) targets in real time by analyzing the strength of reflected signals using an optical attenuator 12 placed in the path of the returning signals 44.

In one embodiment of the present invention as depicted in FIG. 2, the optical attenuator 12 further includes an optical encoder with a wheel 64 placed in the path of the returning signals 44 and a wheel motor 66 configured to measure the position of the wheel attenuator 64. The attenuator is turned using a wheel motor 66 in such a way that the peak of the returning signal is within the dynamic range of the electronics employed by the Optical Station 12.

In another embodiment of the present invention, the attenuator wheel is implemented using a glass optical encoder 70 as shown in FIG. 3. The disk 70 is attached to the motor 66 of the encoder so that it rotates with the shaft 68. The disk 70, as shown in FIG. 3, is typically glass engraved via conventional IC lithography technique to include a plurality of lines 72 and 74. The arrows indicate that the lines 72 and 74 extend entirely around the circumference of the disk 70. A light emitting diode (not shown) is arranged on one side of the disk 70 and a photodetector (also not shown) is positioned on the other side. The light emitting diode/photodetector combination is fixed and does not rotate with the disk 70. As the attenuator's wheel 64 attached to the shaft 68 is rotated, the disk 70 also rotates and the lines 72 successively pass between the light emitting diode and photodetector inducing output signals indicative of the passing lines. Each line is equivalent to one cycle. In one embodiment, disk 70 can include a disk of 3.5 inches in diameter. Although disks can be provided with a various number of lines, the maximum number of lines available for this size and type of rotary encoder is in the range of 9000 lines (the lines 72 and 74 of FIG. 3 not being to scale). This is also referred to as the "count" of the encoder and results in a maximum of 9000 cycles per shaft revolution.

FIG. 4 shows the typical outputs 90 for the rotary optical encoder 70 of FIG. 3. Although various output configurations can be provided, channels A 92 and B 96 (as well as their complementary channels ⁻A 94 and ⁻B 98) provide the primary outputs of the encoder 64 and can alternatively be generated in a sine wave form. Output A is generated by the lines 72 in FIG. 3 as described above. Output B is generated by a second light emitting diode/photodetector combination sensing a second set of lines 74 shown in FIG. 3. This second set of lines 74 is identical to the first set of lines 72 except that it is 90 degrees out of phase from the first set of lines 72. Accordingly, output B is simply output A shifted by 90 degrees or a quadrature (Q) wave form of output A. By having two output wave forms of the same frequency which are 90 degrees out of phase, it is possible to determine the direction of motion of the disk 70, and, therefore, the device attached to disk 70. This is conventionally accomplished by providing the A and B signals as the "D" and "CLOCK" inputs, respectively, of a D flip-flop. As a result, if the Q output line is high, the disk is being rotated counterclockwise. Since the output on channels A and B provide 9000 cycles per shaft revolution, one cycle can be provided every 0.04 degree of rotation. As known by those skilled in the art, internal and/or external cycle interpolation can be added to increase the number of counts per revolution. With regard to the specific rotary encoder shown in FIG. 3, for example, so-called external four times circuitry can be added to provide 36,000 counts per revolution, and internal ten times circuitry and external four times circuitry can be added to provide 360,000 counts per revolution. This type of circuitry, which can conventionally be added to any type of encoder, adds considerable expense and complexity to the encoder. Thus, the encoder 70 generates a pulse train of signals related to the movement of the encoder, that is the encoder is capable of encoding the amplitude of the return signal. By using the predetermined correlation between the coded pulse train of signals with the amplitudes of the return signal, the microprocessor 62 is capable of measuring an amplitude of a particular return signal by reading a particular coded pulse train sequence of signals generated by the amplitude of the particular return signal. In another embodiment of the present invention (not shown), an absolute position encoder can be used to measure an amplitude of a return signal. In the absolute position encoder, each position yields a unique code corresponding to a unique amplitude of the return signal. In this embodiment, a stepper motor (not shown) can be used to drive the attenuator wheel to a known position.

Referring still to FIG. 1, the amplitude measurement unit including a microprocessor (not shown) using the encoded data provided by the attenuator 12 including an encoder 70 of FIG. 3 is capable of measuring an amplitude of a return signal. By utilizing both the distance to the target measured by the EDM 14 and the strength of the return signal measured by the attenuator 12, the real time analyzer microprocessor 24 correlates the distance to the target with the strength of the return, and makes a decision as to whether the target is a cooperative target (C_Target) (for instance, a prism) or a non-cooperative target (NON_C_Target) (for instance, a tree).

I. The Snapshot of a Target-a Real Time Mode

In one embodiment, in order to make such a decision in real time, the analyzer microprocessor 24 should use an empirically generated look-up table 20 (C_Target) to a distance from the cooperative target (C_Target) to the Optical Station 14. The prepared look-up table 20 can be downloaded into the memory 22. The prepared look-up table 20 can be also uploaded from the memory 22 by the real time analyzer microprocessor 24. The analyzer microprocessor 24 selects a target from the set of targets (C_AND_NON_C_Target) by using the look-up table 20 as follows: the target is selected only if an amplitude of an actual reflected signal from the selected target is equal to or greater than an expected amplitude of a reflected signal from a cooperative target (C_Target) placed at the selected target's distance. If this is the case, the selected target comprises a cooperative target (C_Target) (for instance, a prism).

Referring still to FIG. 1, the distance to a selected cooperative target (C_Target) can be displayed in real time using a real time display 18. It is believed, that a person skillful in the art knows how to implement a look-up table 20, a memory unit 22, an analyzer microprocessor 24, and a real time display 18 in order to practice the present invention.

EXAMPLE I

The measured distance is 27 meters, the measured amplitude of the return signal is 2 volts; the look up table returns that, for distances of 25 to 30 meters, an amplitude from a prism should be more than 1.5 volts, else the target is not a prism. The result is that the target is a prism, and it is displayed in real time in the real time display.

Turning next to FIG. 5, there is provided a flow chart 100 illustrating a method for selecting at least one cooperative target (C_Target) from a set of targets (C_AND_NON_C_Target) including a subset of cooperative targets (C_Target) and a subset of non-cooperative targets (NON_C_Target). In a preferred embodiment, method 100 is performed by the system 10 of FIG. 1.

Generated by Optical EDM Station 14 optical signal (step 102 of FIG. 5) is directed at each target (32, 34, 36, 38, 40) (step 104 of FIG. 5), and at least one reflected optical signal is received by Optical Station (step 106 of FIG. 5). If a particular reflected optical signal can be matched with a target that reflected that particular signal and is marked by the reflection, that is the result of the test (110 of FIG. 5) is a logical arrow 114 YES of FIG. 5, that particular reflected optical signal is analyzed (step 116 of FIG. 5) in order to make a decision whether the target that reflected that particular optical signal is a cooperative target (C_Target). If a match cannot be achieved for that particular reflected signal (logical arrow 112 NO), the test (110 of FIG. 5) is preferably performed for the next reflected signal, and so on until the match is achieved.

FIG. 6 provides a flowchart 120 illustrating the steps performed preferably by the system 10 of FIG. 1 in order to analyze a particular reflected signal if the match between the particular reflected signal and a target that reflected that signal is achieved (step 108 of FIG. 5). The first step (102) to empirically generate a look-up table (20 of FIG. 1) that relates an expected amplitude of a reflected signal from a cooperative target (C_Target) to a distance from the cooperative target (C_Target) to the Optical Station (14 of FIG. 1) should be performed before the system 10 of FIG. 1 becomes operational.

After the look-up table 20 of FIG. 1 is prepared, a distance from Optical Station 14 to a particular target is measured by the EDM device (step 124 of FIG. 6) as was fully explained above. The crucial step now is to measure an amplitude of the signal reflected from that particular target (step 126 of FIG. 6). In one embodiment, the amplitude of the reflected signal is measured by using the optical attenuator 12 of FIG. 1 as was fully explained above. The next step (step 128 of FIG. 6) is to select a target from set of targets by using the prepared look-up table. The target is selected only if the measured actual amplitude of the signal reflected from the selected target is equal to or greater than an expected amplitude of a reflected signal from a cooperative target (C_Target) placed at the selected target's distance, which defines an amplitude of the threshold for a reflected signal.

In the preferred embodiment fo the present invention, the set of cooperative targets (C_Target) can be further subdivided into two classes: a class of very strong reflectors (like prisms), and a class of strong reflectors (like windows, bumpers, and such). A set of non-cooperative targets (NON_C_Target) includes a set of all weak reflectors (like trees). Thus, the class of very strong reflectors comprises a set of targets with an amplitude of a reflected signal above the upper threshold (targets_above_threshold)$^I$, wherein the upper threshold is defined as an amplitude of a signal reflected from a very strong reflector placed at the targets's distance from the Optical Station (for instance, a prism). On the other hand, the class of strong reflectors comprises a set of targets with an amplitude of a reflected signal below the upper threshold and above the lower threshold (targets_above_threshold)$^{II}$, wherein the lower threshold is defined as an amplitude of a signal reflected from a strong reflector placed at the targets's distance from the Optical Station (for instance, a window).

Turning back to FIG. 6, if the look-up table test (130 of FIG. 6) is passed (logical arrow 134 YES of FIG. 6), the selected target comprises a cooperative target (C_Target). The measured distance to the selected cooperative target (C_Target) can be displayed in real time (step 136 of FIG. 6) on the real time display 18 (of FIG. 1). If, on the other hand, the look-up table test 130 (of FIG. 6) is not passed, the target is not a cooperative target (logical arrow 132 NO of FIG. 6) and the target is not selected.

FIG. 7 depicts a flowchart describing the steps performed preferably by the system 60 (of FIG. 2) including an optical attenuator 12 (of FIG. 1) in order to measure an amplitude of a reflected signal 44 (of FIG. 2). In one embodiment, the optical attenuator 12 (of FIG. 2) includes a wheel 68 (of FIG. 2) including an optical encoder 70 (of FIG. 3). (Please, see the full description of the functioning of the optical encoder 70 above). After a position of the wheel of the optical encoder that is placed in the path of the reflected signal is measured (step 142 of FIG. 7), a pulse train of signals related to the measured position of the wheel encoder is generated (step 144 of FIG. 7). By using the relationship between the encoded data and the strength of the return signal, the amplitude of the reflected return signal is measured (step 146 of FIG. 7).

II. The Painting of an Image of a Cooperative Target Using a Color in a Postprocessing Mode In an alternative embodiment of the present invention, FIG. 8 provides a flowchart 150 for creating a database 26 (of FIG. 1) (step 152 of FIG. 8) comprising a set of elements, wherein each element of the database includes a distance from the Optical Station 14 (of FIG. 1) to a target and an amplitude of an actual signal reflected from the target that is preferably measured according to the above described procedure depicted in FIG. 7. The target is from the set of all targets (C_AND_NON_C_Target) that includes a subset of cooperative targets (C_Target) and a subset of non-cooperative targets (NON_C_Target). Using a color post processor 28 (of FIG. 1) the database 26 is post-processed (step 154 of FIG. 8) in order to create a plurality of colors. Each color is a function of one element of the database 26. Finally (step 156 of FIG. 8), a color-image of a particular cooperative target is created by using a color corresponding to that particular target. The color-image of a particular cooperative target can be viewed in the post processing mode using a color-image display 30 (of FIG. 1).

Thus, "painting" of a particular target according to the present invention can be considered as a selection of a color to paint an image of the target, wherein the selected color is determined by an element of the database 26 (of FIG. 1) that includes a distance from the Optical Station 14 (of FIG. 1) to that particular target and an amplitude of an actual signal reflected from that particular target. This approach assumes that all uniform cooperative targets (a set of strong reflectors, or a set of very strong reflectors) satisfy the empirically built look-up table 20 (of FIG. 1).

EXAMPLE II

The painting of a 2d-image of a target is done by using a color that is selected by using the following element α from the database:

Element α:=(Distance=D; Amplitude=f(D));
Color or Brightness of 2d-image=F(α).

III. The Usage of a Super-color in a Postprocessing Mode to Differentiate between a Strong Reflector and a Very Strong Reflector FIGS. 9–11 illustrate how one can use a normalizing function in order to make a further selection between a cooperative target that is a very strong reflector (like a prism) and a cooperative target that is a strong reflector (like a window) even if the very strong reflector is located far away from the Optical station 14, and a strong reflector is located very close to the Optical station. FIG. 9 illustrates how amplitude of a return signal depends to the distance from the Optical Station. The blimp 162 indicates the presence of a very strong reflector at a certain distance. FIG. 10 depicts a normalizing function 170. FIG. 11 shows the result 180 of multiplication of the amplitude of the return signal by the normalizing function 170 (of FIG. 10) that removes effect of distance on the amplitude of the return signal so that a very strong target located fat away tat was very faint blimp 162 before using the normalizing function 170 (of FIG. 10) is clearly seen as an amplitude 182 after the normalizing function 170 (of FIG. 10) has been used.

FIG. 12 provides a flowchart 190 that illustrates the steps performed by the system 10 (of FIG. 1) in order to create in the post-processing mode a super-color image of a cooperative target (C_Target). After multiplying an actual amplitude of the signal reflected from a target by a normalizing function (step 192 of FIG. 12), a super-color image of the target is created (step 194 of FIG. 12).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method of selecting at least one cooperative target from a set of targets, wherein said set of targets includes a subset of cooperative targets and a subset of non-cooperative targets; said method comprising the steps of:

generating an optical signal by using an Optical Station;
directing said optical signal at each said target from said set of targets;
receiving at least one reflected optical signal by said Optical Station; wherein each said reflected optical signal is reflected from one said target from said set of targets; and wherein each said target is marked by said reflection;
matching each said reflected optical signal with one said target from said set of targets;
creating a database comprising a set of elements, wherein each element of said database includes a distance from said Optical Station to one said target from said set of targets and an amplitude of an actual signal reflected from said one target;
post processing said database to create at least one color, wherein each said color is a function of one said element of said database; and
creating a color-image of each said target using said at least one color corresponding to said target;
wherein said cooperative target has a substantially strong reflectivity in a direction back to said Optical Station;
and wherein said non-cooperative target has a substantially weak reflectivity in a direction back to said Optical Station.

2. The method of claim 1, wherein said step of creating said color-image of each said target further includes the steps of:

multiplying an actual amplitude of said signal reflected from said target by a normalizing function; wherein said normalizing function creates a super-color for each said target; and wherein said super-color is a function of said normalized amplitude of said actual signal reflected from said target; and wherein said super-color for each said target does not depend on a distance of said target from said Optical Station; and
creating a super-color image of each said target.

3. A method of selecting at least one cooperative target from a set of targets, wherein said set of targets includes a subset of cooperative targets and a subset of non-cooperative targets; said method comprising the steps of:

generating an optical signal by using an Optical Station;
directing said optical signal at each said target from said set of targets;
receiving at least one reflected optical signal by said Optical Station;
wherein each said reflected optical signal is reflected from one said target from said set of targets; and wherein each said target is marked by said reflection;
matching each said reflected optical signal with one said target from said set of targets;
measuring a distance from said Optical station to each said marked by said reflection target from said set of targets;
generating a pulse train of signals related to a position of an encoder; and
correlating said pulse train of signals with said amplitude of said one reflected signal;
wherein said Optical Station includes an optical attenuator including a wheel, and wherein said optical attenuator is placed in the path of said reflected signal;
and wherein said wheel of said optical attenuator further includes said optical encoder.

4. A system for selecting at least one target from a set of targets comprising:

a means for generating an optical signal;
a means for directing said optical signal at each said target;
a means for receiving at least one reflected optical signal; wherein each said reflected optical signal is reflected by one said target marked by said reflection;
a means for matching each said reflected optical signal to one said marked by said reflection target;

a database comprising at least one element, wherein each said element of said database further includes a distance from said Optical Station to one said target from and an amplitude of an actual signal reflected from said one target;

a means for post processing said database to create at least one color, wherein each said color is a function of one said element of said database;

a means for multiplying an actual amplitude of said signal reflected from said target by a normalizing function; wherein said normalizing function creates a super-color for each said target; and wherein said super-color is a function of said normalized amplitude of said actual signal reflected from said target; and wherein said super-color for each said target does not depend on a distance of said target from said Optical Station; and a means for creating a super-color image of each said target.

5. A system for selecting at least one target from a set of targets comprising:

a means for generating an optical signal;

a means for directing said optical signal at each said target;

a means for receiving at least one reflected optical signal; wherein each said reflected optical signal is reflected by one said target marked by said reflection;

a means for matching each said reflected optical signal to one said marked by said reflection target;

a means for analyzing said at least one reflected signal in order to select at least one target from said set of targets;

a means for measuring a distance to each said target from said means for generating said optical signal;

a means for measuring an amplitude of each said reflected signal; and a means for measuring a position of a wheel of an optical attenuator;

wherein said optical attenuator includes said wheel; wherein said wheel of said optical attenuator further includes said optical encoder; and wherein said optical attenuator is placed in the path of said reflected signal; wherein said means for measuring said position of said wheel of said optical attenuator further includes:

a means for generating a pulse train of signals related to a position of an encoder; and a means for correlating said pulse train of signals with said amplitude of said one reflected signal.

* * * * *